Patented Feb. 4, 1930

1,746,064

UNITED STATES PATENT OFFICE

WILHELM TRAUBE, OF BERLIN, AND EMIL HELLRIEGEL, OF REGENSBURG, GERMANY

PROCESS OF PRODUCING N-MONOALKYL DERIVATIVES OF THE AMINOPHENOLS

No Drawing. Application filed September 9, 1927, Serial No. 218,571, and in Germany November 15, 1926.

When treating equimolecular quantities of primary aromatic amines with alkylating means, part of the amines in practically all cases is not acted upon, and difficulty separable mixtures of mono- and di-alkyl-arylamines are produced thereby, whereas the production of the monoalkyl-arylamine often is the desired object of the treatment. In case the object in view is the production of the monoalkyl-derivatives of the aminophenols substituted in the $NH_2$-group, a further complication is given by the fact that the alkylation may extend also to the hydroxyl group.

Now we have found that an easy introduction of only one alkyl group into the amino group of an aminophenol may be obtained with a good yield by firstly producing the hydroxyaryl cyanamides which may be easily prepared by desulphuration from the corresponding phenol substituted thiourea compounds and which, in the amino group, contain only one hydrogen atom, by then decomposing the obtained hydroxyaryl cyanamides or their alkaline salts which contain one atom of alkaline metal in their molecule, by means of alkylating means, and by splitting off the cyan group from the hydroxyaryl alkylcyanamides thus obtained, which is easily done by treating them with acids, alkali or water. It could by no means be foreseen that by the action of the alkylating means on the salts of the hydroxyaryl cyanamides containing one atom of alkaline metal, the alkyl would replace only the hydrogen atom of the cyanamide group and not that of the hydroxyl group, as both these hydrogen atoms are of the same acidity.

For the treatment with the alkylating means it is not necessary to eliminate the monopotassium or monosodium salts of the hydroxaryl cyanamides in substance; it is sufficient to produce their aqueous solutions by dissolving one molecule of hydroxyaryl cyanamide in a quantity of alkali lye containing one molecule of potassium hydroxide or of sodium hydroxide. It is also possible to use alcoholic solutions of the hydroxyaryl cyanamides mixed with one equivalent of alkaline hydroxide or alcoholate.

Contrary to the processes hitherto known, the production and yield of the N-monoalkylaminophenols by way of the cyanamidophenols is a very satisfactory one. The compounds are principally used for photographic purposes.

The general way of the steps of the whole process is shown by the following equations, given as an example, wherein Alk. is an alkyl group.

I. $HOC_6H_4NH_2.HCl + NH_4CNS =$
$HOC_6H_4NHCSNH_2 + NH_4Cl$
II. $HOC_6H_4NHCSNH_2 + PbO =$
$HOC_6H_4NHCN + PbS + H_2O$
III. $HOC_6H_4NHCN + NaOH =$
$HOC_6H_4NNaCN + H_2O$
IV. $HOC_6H_4NNaCN + Alk._2SO_4 =$
$HOC_6H_4N\ Alk.\ CN + Na\ Alk.SO_4$
V. $HOC_6H_4N\ Alk.\ CN + 3H_2O =$
$HOC_6H_4N\ Alk.\ H + CO_2 + H_2O + NH_3$

*Example 1.*—145 parts of p-aminophenol chlorhydrate are heated with a certain excess of potassium thiocyanate, i. e. 130–140 parts, in an aqueous solution, and are thus, in theoretic yield, transformed into p-thiocarbamidophenol (Berichte der deutschen chemischen Gesellschaft 16, page 375). 168 parts (1 mol.) of the latter compound are now dissolved in that quantity of potash lye which contains 3 molecules of the alkali hydroxide, i. e. 900 parts of potash lye of 20% contents, and to the heated solution is now added the heated solution of about 420 parts of acetate of lead in a small quantity of water. When this mixture is kept for some time at a temperature of 100 degrees C. there takes place a quantitative separation of sulphide of lead, and from the filtrate of the latter the p-hydroxyphenyl cyanamide:

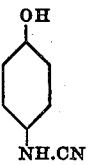

which has not yet been described in literature is precipitated upon neutralization of the said filtrate with acids. This compound shows the form of needles, which are difficultly soluble in water, but dissolve easily in alcohol, the melting point being at 265° C.

In order to alkylate this composition, 23 parts of sodium (1 atom) are dissolved in absolute alcohol, and 134 parts (1 molecule) of p-hydroxyphenyl cyanamide and about 150 parts of methyliodide are added. After having heated the mixture up to the completion of the reaction, the alcohol is expelled and the residue is taken up with water, wherein the hydroxyphenyl methylcyanamide

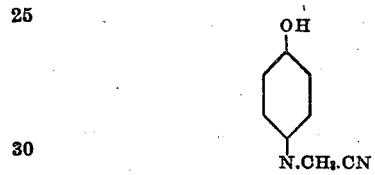

is separated out in the form of a quickly solidifying oil. The composition is purified by recrystallization from water or benzol, and will melt then at 133–134° C. It is easily soluble in alcohol and ether, and dissolves difficultly in water.

For the purpose of producing p-methylaminophenol from this composition it is heated to 100–120° C. with such a quantity of sulphuric or muriatic acid of 10–20% contents, as to have one molecule $H_2SO_4$ or two molecules HCl to one molecule of the p-hydroxyphenyl methylcyanamide, i. e. to 140 parts of the latter compound there are to be used 500–550 parts of sulphuric acid of 20% contents or about 400 parts of muriatic acid of 20% contents. However, it is also possible to use an excess of acid for splitting off the cyan group. From the solutions obtained the p-methylaminophenol is isolated either in the free state or as a salt in the usual manner, e. g. as sulphate or as nitroso-combination. In order to isolate it as sulphate, the reaction product obtained by the action of sulphuric acid on the p-hydroxyphenyl methylcyanamide and consisting of an equimolecular mixture of p-methylaminophenol sulphate with ammonium sulphate is recrystallized from the watery solution, in which case the ammonium sulphate remains in the solution and thereby is separated from the p-methylaminophenol sulphate. If it is desired to obtain the free p-methylaminophenol from the said salt mixture, this mixture is to be treated with a solution of sodium carbonate.

Instead of methyliodide, also methylbromide or methylchloride may be used. Also the alklation may be effected by means of the alkyhalogenides when using an aqueous alkaline solution containing one molecule of alkali to one molecule of hydroxyphenylcyanamide, or the salts of the hydroxylphenylcyanamide may be treated with alkylating means without the presence of a solvent.

*Example 2.*—134 parts (1 molecule) of the hydroxyphenyl cyanamide produced as per Example 1 are dissolved in a solution of 40 parts of sodium hydroxide in a not too great quantity of water. To the thus formed solution which is cooled and continually stirred 130 parts (about 1 molecule) of dimethylsulphate are gradually added. The separating out of the formed hydroxyphenyl methylcyanamide takes place to a considerable part before the entire quantity of the dimethylsulphate has been added.

10 parts of the hydroxyphenyl methylcyanamide thus obtained are now heated to about 150° C. for several hours in a closed vessel together with 10 to 30 parts of water. A part of the formed N-methyl-p-aminophenol is separated during this heating process in oily condition. The remaining watery solution contains the other part of this compound together with acid carbonate of ammonia formed in the saponification of the cyan group. This watery solution now is inspissated under normal or reduced pressure. The acid carbonate of ammonia hereby is evaporated with the water whereas the dissolved part of the formed N-methyl p-aminophenol is separated in oily condition when the greatest part of the water is evaporated. If it is desired to obtain the said compound as sulphate, which is the most important salt thereof, the required quantity of sulphuric acid is added after the evaporation of the acid carbonate of ammonia to the whole quantity of the free N-methyl p-aminophenol obtained, i. e. 18 parts of a sulphuric acid of 20% contents.

The production of the N-ethyl-p-aminophenol is effected in a quite analogous manner from the p-hydroxyphenyl cyanamide by using diethyl-sulphate.

For the purpose of producing the hydroxyphenyl methylcyanamide it is possible to make dimethylsulphate act also directly on the solutions of the monoalkali salts of the hydroxylphenol cyanamides as they are obtained according to Example 1 when desulphurizing the thiocarbamidophenol with acetate of lead in the presence of 3 molecules of alkali.

For the alkylation there may be used also chlorsulphonic acid esters and the esters of aryl sulphonic acids.

*Example 3.*—168 parts of m-hydroxyphenyl thiourea are dissolved in about 450 parts of potash lye with 14% contents, and the solution heated to 100° C. is treated with an excess of lead-oxide until complete desulphurization of the thiourea has been obtained. From the filtrate of sulphuric lead the formed m-hydroxyphenyl cyanamide is separated out by introducing carbon dioxide. It has the form of needles that are melting at 137° C. and will dissolve difficultly in water and easily in alcohol.

135 parts of this compound are now dissolved in 1000 parts of normal alkali lye, and 130 parts of dimethylsulphate are added then to the continually stirred solution. After some time the m-hydroxymethylphenyl cyanamide crystallizes out from the solution with a good yield. It is melting at 135° C., and is difficultly soluble in water, but easily soluble in alcohol.

For producing the m-methylaminophenol from this substance, 140 parts of the obtained substance are heated for several hours to 100–120° C. with a quantity of sulphuric acid of 10–20% contents calculated for a molecule of the substance, i. e. with 500–1000 parts of the said sulphuric acid. From the solution obtained the m-methylaminophenol is isolated as well crystallizing nitrate after having removed the sulphuric acid and the ammonia. The removal of the sulphuric acid is performed by heating the obtained solution with carbonate of barium and eliminating the formed sulphate of barium by filtration. The resulting filtrate is inspissated, and the ammonia is evaporated thereby. The m-methylaminophenol which now separates is dissolved in the calculated quantity of diluted nitric acid, i. e. 250 parts of nitric acid of 25% contents. The formed nitrate separates upon inspissating the solution.

In a quite corresponding manner as that described in the foregoing examples any other alkyl groups than methyl and ethyl may be introduced into the aminophenols.

Having now particularly described and ascertained the nature of our said invention, what we claim is:

1. Process of producing N-monoalkyl derivatives of aminophenols consisting in treating a phenol substituted thiourea with desulphurizing means to produce a hydroxyaryl cyanamide, treating the obtained hydroxyaryl cyanamide with alkylating means to produce a hydroxyaryl alkylcyanamide, and treating the formed hydroxyaryl alkylcyanamide with means serving for splitting off the cyan group.

2. A process of producing N-monoalkyl derivatives of aminophenols consisting in treating a phenol substituted thiourea with desulphurizing means to produce a hydroxyaryl cyanamide, producing an alkali salt containing one atom of alkali metal in the molecule of the said hydroxyaryl cyanamide, treating this salt with alkylating means to produce a hydroxyaryl alkylcyanamide, and hereafter treating the formed hydroxyaryl alkylcyanamide with means serving for splitting off the cyan group.

3. A process of producing N-monoalkyl derivatives of aminophenols consisting in treating a phenol substituted thiourea with desulphurizing means to produce a hydroxyaryl cyanamide, treating the obtained hydroxyaryl cyanamide with alkylating means in the presence of solvents to produce a hydroxyaryl alkylcyanamide, and treating the formed hydroxyaryl alkylcyanamide with means serving for splitting off the cyan group.

4. A process of producing N-monoalkyl derivatives of aminophenols consisting in treating a phenol substituted thiourea with desulphurizing means to produce a hydroxyaryl cyanamide, producing an alkali salt containing one atom of alkali metal in the molecule from the said hydroxyaryl cyanamide, treating this salt with alkylating means in the presence of solvents to produce a hydroxyaryl alkylcyanamide, and hereafter treating the formed hydroxyaryl alkylcyanamide with means serving for splitting off the cyan group.

5. A process of producing N-monoalkyl derivatives of aminophenols consisting in treating a phenol substituted thiourea with a lead compound to produce a hydroxyaryl cyanamide, treating the obtained hydroxyaryl cyanamide with alkylating means to produce a hydroxyaryl alkylcyanamide, and treating the formed hydroxyaryl alkylcyanamide with means serving for splitting off the cyan group.

6. A process of producing N-monoalkyl derivatives of aminophenols consisting in treating a phenol substituted thiourea with desulphurizing means to produce a hydroxyaryl cyanamide, treating the obtained hydroxyaryl cyanamide with an alkali and an alkylating means to produce a hydroxyaryl alkylcyanamide, hereafter treating the formed hydroxyaryl alkylcyanamide with means serving for splitting off the cyan group to produce a monoalkyl aminophenol, and finally treating the resulting monoalkyl aminophenol with an acid for isolating the compound in the form of a crystallized salt.

7. A process of producing N-monoalkyl derivatives of aminophenols consisting in treating a phenol substituted thiourea with desulphurizing means to produce a hydroxyaryl cyanamide, treating the obtained hydroxyaryl cyanamide with alkylating means in the presence of alkali to produce a hydroxyaryl alkylcyanamide, treating the formed hydroxyaryl alkylcyanamide with water while heating to form a monoalkyl aminophenol, and hereafter isolating the obtained monoalkyl aminophenol.

In testimony whereof we have hereunto set our hands.

WILHELM TRAUBE.
EMIL HELLRIEGEL.